United States Patent [19]
Lee

[11] Patent Number: 5,622,285
[45] Date of Patent: Apr. 22, 1997

[54] TAPED CULINARY DISPENSING DEVICE

[76] Inventor: Ida J. S. M. Lee, 19 Lansdown Pl. Flat 14, Hove, East Sussex, Great Britain, BN3 1HB

[21] Appl. No.: 619,552

[22] PCT Filed: Jul. 28, 1995

[86] PCT No.: PCT/GB95/01775

§ 371 Date: Mar. 27, 1996

§ 102(e) Date: Mar. 27, 1996

[87] PCT Pub. No.: WO96/03884

PCT Pub. Date: Feb. 15, 1996

[30] Foreign Application Priority Data

Jul. 29, 1994 [GB] United Kingdom ............ 9415343

[51] Int. Cl.[6] .................................................. B67D 5/38
[52] U.S. Cl. ........................................ 222/158; 222/474
[58] Field of Search ............................... 222/158, 474, 222/565; 426/289; 99/494; 141/345

[56] References Cited

U.S. PATENT DOCUMENTS

| | | | |
|---|---|---|---|
| 1,094,350 | 4/1914 | Walter | 141/345 |
| 1,894,157 | 1/1933 | Campbell | 222/474 |
| 3,512,681 | 5/1970 | Frankel | 222/158 |
| 3,643,838 | 2/1972 | Allen | 222/565 X |
| 4,771,726 | 9/1988 | Fitch, Jr. | 118/25 |
| 5,060,823 | 10/1991 | Perlman | 222/1 |
| 5,109,760 | 5/1992 | Ansari | 99/494 |

FOREIGN PATENT DOCUMENTS

| | | |
|---|---|---|
| 0326650 | 8/1989 | European Pat. Off. . |
| 2627465 | 2/1988 | France . |
| 2665423 | 2/1992 | France . |
| 3447590 | 7/1986 | Germany . |
| 4202679 | 8/1993 | Germany . |
| 285188 | 2/1928 | United Kingdom . |
| 698116 | 10/1953 | United Kingdom . |
| 1142074 | 2/1969 | United Kingdom . |

*Primary Examiner*—Gregory L. Huson
*Attorney, Agent, or Firm*—Lahive & Cockfield

[57] ABSTRACT

A dispensing device for dispensing cake toppings or the like, comprising a frusto-conical container having an outlet formed in the base thereof and a valve assembly for closing the outlet. The valve assembly comprises two downwardly-inclined shutters hinged to opposite sidewalls of the outlet, the shutters being pivotally connected to respective branches of a bifurcated actuating member. A trigger is provided on the inner surface of a handle, for actuating the valve assembly. A sieve member may also be provided. In use, the container is filled with the topping material to be dispensed. The user holds the device over, for example, a cake and actuates the valve assembly to dispense the material, thereby ensuring that all of the material is dispensed onto the desired area of the cake.

16 Claims, 3 Drawing Sheets

TAPED CULINARY DISPENSING DEVICE

This invention relates to a dispensing device for dispensing toppings onto cakes or other products.

Toppings such as icing sugar and nuts are usually sprinkled onto cakes or other products using a sieve. However, a disadvantage of this arrangement is that it is difficult to accurately control the amount of material dispensed, since some of the material is inevitably dispensed from the sieve before it reaches the cake or other product.

I have now devised a dispensing device which is able to dispense accurate quantities of topping materials onto cakes or other products.

In accordance with this invention, there is provided a dispensing device for dispensing topping material onto cakes or other products, the device comprising a container having a sidewall which tapers inwardly towards an opening in the base thereof, the base being provided with valve means which can be operated to dispense material from the container.

In use, the container is filled with the topping material, then the container is held over the area onto which the topping material is to be dispensed and the valve means actuated. This arrangement ensures that all of the topping material in the container is dispensed onto the desired area of the cake or other product.

Preferably the container is graduated to indicate the volume of the material in the container. The vertical spacing between successive graduations representing the same volume of material, gets progressively closer towards the top of the container, owing to the tapering sidewall. This allows small quantities of material to be measured out relatively accurately, since the spaced-apart graduations towards the base of the container can be sub-divided to indicate smaller volumes. Preferably the container is frusto-conical.

Preferably the valve means is arranged between the container and a dispensing outlet, the outlet comprising a perforated member such as a sieve.

Preferably the perforated member is removable, so that it can be interchanged with other perforated members having different sized perforations and/or a different number of perforations.

Preferably the area of the perforated member is greater than the area of the opening in the base of the container, so that a broad stream of material is dispensed from the device.

Preferably the valve means comprises a flap which is biased to normally close the opening in the base of the container.

Preferably the valve means comprises a pair of downwardly inclined flaps hinged to opposite sides of the opening in the base of the container.

Preferably the dispensing device comprises a lever for actuating the valve means, in order to open the valve means and allow material to flow from the container.

Preferably the dispensing device is arranged for hand use, so that the user can hold the device over a cake or other product and carefully dispense toppings onto it.

Preferably the device comprises a handle. Preferably the actuating lever is mounted to the handle, so that the user can conveniently actuate the valve means whilst supporting the container over the cake or other product.

An embodiment of this invention will now be described by way of example only and with reference to the accompanying drawings, in which.

Figure 1:
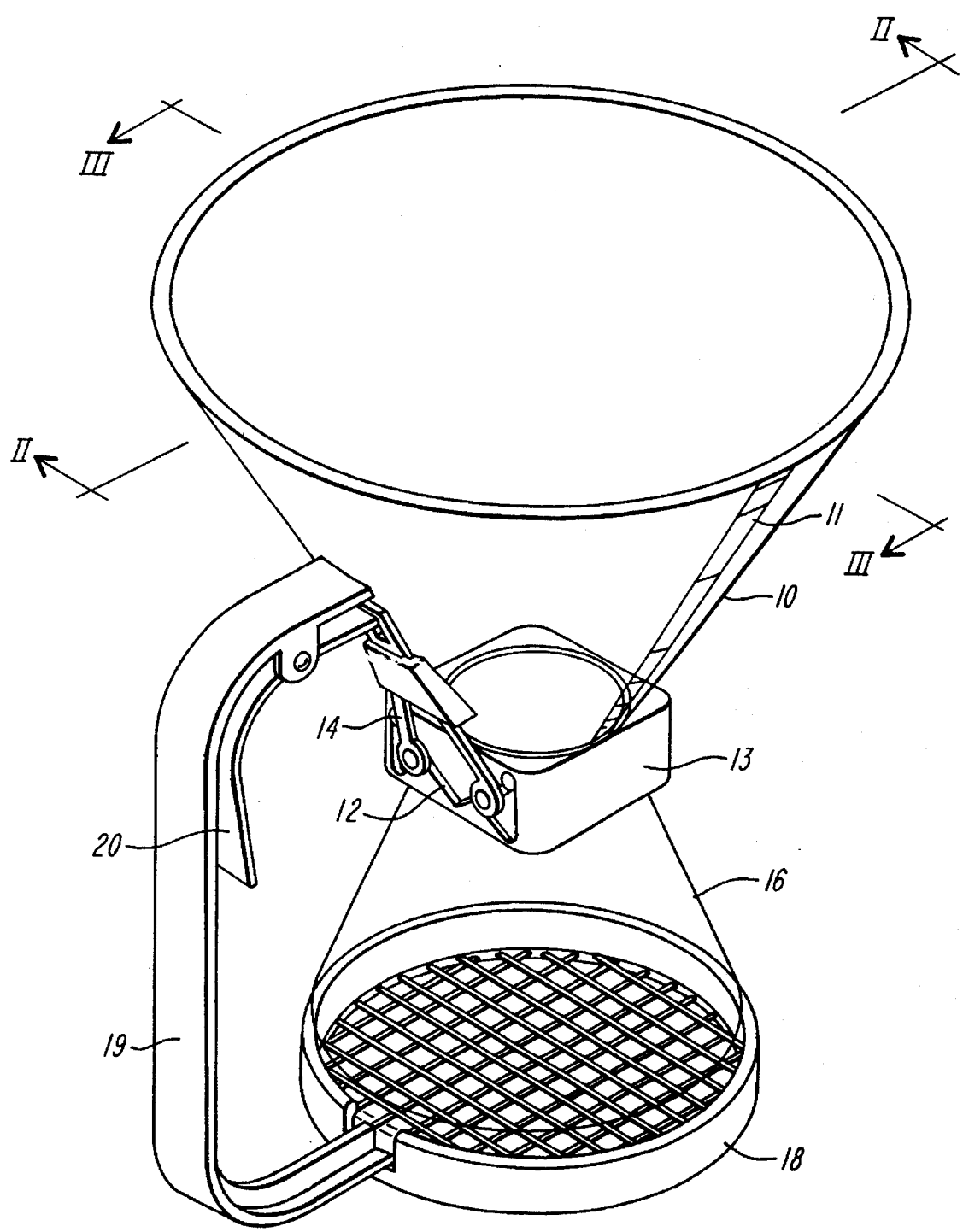
FIG. 1 is a perspective view of a dispensing device for cake toppings in accordance with this invention.
Figure 2:
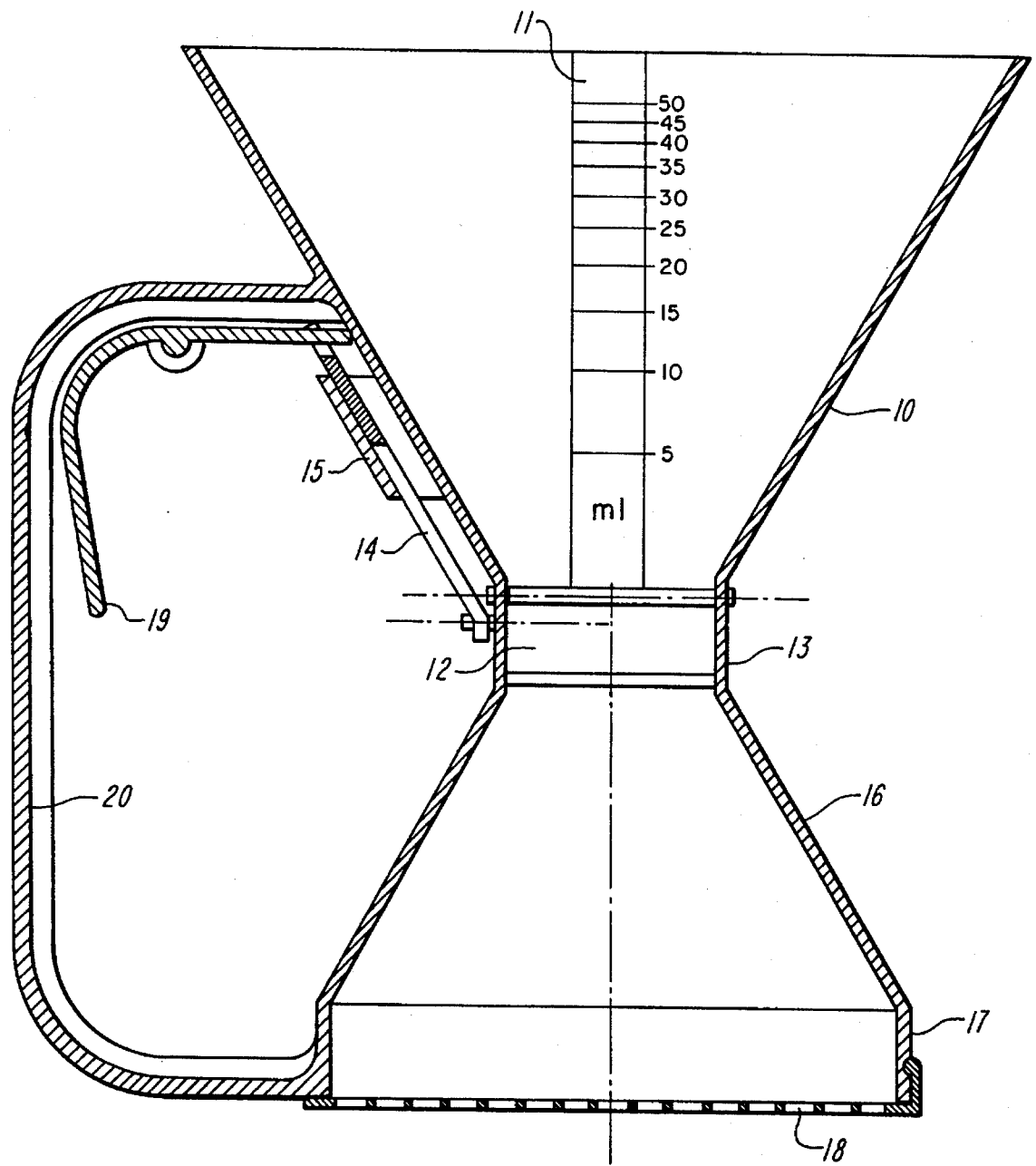
FIG. 2 is a sectional view along the line II—II of FIG. 1.
Figure 3:
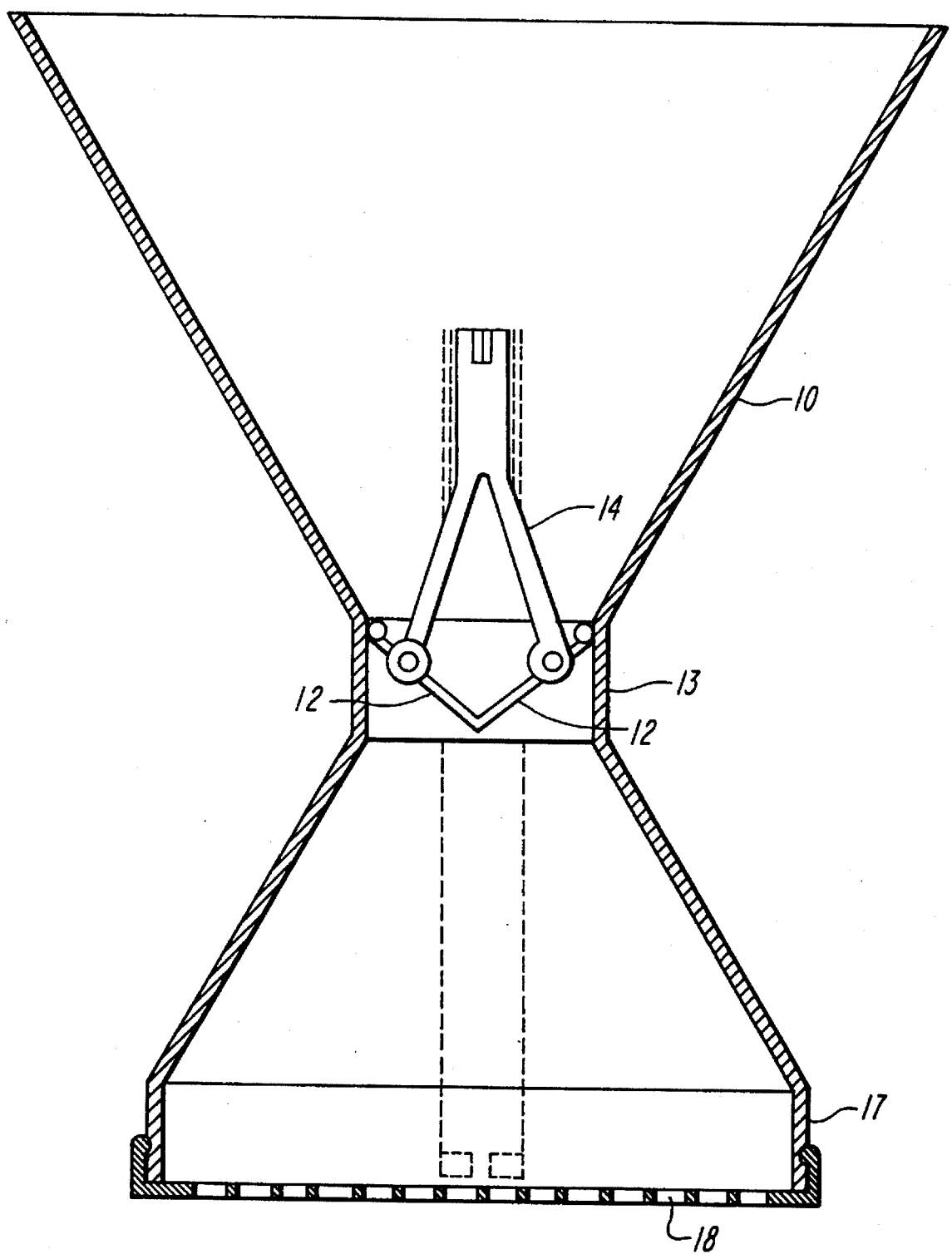
FIG. 3 is a sectional view along the line III—III of FIG. 1.

Referring to the drawings, there is shown a moulded plastics device for dispensing cake toppings or the like, the device comprising a frusto-conical container 10 for holding the topping to be dispensed. The base of the container 10 is formed with an outlet 13 which is provided with a valve assembly for closing this outlet. Graduations 11 are printed or moulded onto the container 10, in order to indicate the volume of the topping material in the container. The graduations are marked in fluid ounces and/or millilitres, and the container is arranged to hold approximately 50 ml of material. Owing to the frusto-conical shape of the container, the vertical spacing between successive graduations, representing a given volume of material is greater towards the bottom of the container then towards the top. This enables small volumes of material to be measured accurately.

The valve assembly comprises a pair of opposed, downwardly-inclined shutters 12 hinged to opposite sidewalls of the outlet 13 in the base of the container 10. The free edges of the shutters 12 meet, when the valve is closed, at a point intermediate the opposite sidewalls of the outlet, thereby preventing material in the container flowing through the outlet. The shutters 12 are pivotally connected to respective branches of a bifurcated actuating member 14. The stem of the actuating member 14 is guided in a channel member 15 on the outside of the container 10.

A frusto-conical duct 16 is connected to the container outlet 13, and tapers outwardly away from the container 10. The free lower edge of the duct 16 comprises a peripheral rim 17, onto which a disc-shaped sieve member 18 can be fitted.

A generally C-shaped handle 19 extends between the container 10 and the duct 16. An L-shaped trigger 20 is pivoted to the inside of the upper portion of the handle 19. The trigger 20 engages an aperture in the actuating member 14, so that when the trigger 20 is pulled against the handle 19 the actuating member 14 is moved downwards, thereby pivoting the shutters 12 downwardly and therefore apart. A spring (not shown) biases the actuating member 14 upwards, and hence keeps the shutters 12 closed together unless the trigger 20 is actuated.

In use, the container 10 is filled with the desired amount of topping material, e.g. icing sugar, using the graduations as a guide to obtain the desired quantity. Next the device is held over the cake or other product, and the trigger 20 is then actuated. Material in the container 10 falls onto the sieve member 18, and is dispensed onto the cake or other product by shaking the device from side-to-side. Alternatively the trigger 20 can be actuated to dispense small amounts of material at a time from the container.

The device may be used without a sieve member attached, or different sieve members may be attached depending on the type of material being dispensed. Another type of sieve member may comprise a reduced dispensing area, so that small cakes or biscuits may be covered with topping.

I claim:

1. A dispensing device for dispensing topping material onto cakes or other products, the device comprising a container having a sidewall which tapers inwardly towards an opening in the base thereof, the base being provided with valve means which can be operated to dispense material from the container, wherein the valve means is arranged between the container and a dispensing outlet, the outlet comprising a perforated member.

2. A dispensing device as claimed in claim 1, wherein the container is graduated to indicate the volume of the material in the container.

3. A dispensing device as claimed in claim 1, wherein the container is frusto-conical.

4. A dispensing device as claimed in claim 1, wherein the perforated member is removable.

5. A dispensing device as claimed in claim 1, wherein the area of the perforated member is greater than the area of the opening in the base of the container, so that a broad stream of material is dispensed from the device.

6. A dispensing device as claimed in claim 1, comprising a lever for actuating the valve means.

7. A dispensing device as claimed in claim 1, the device being arranged for hand use, so that the user can hold the device over a cake or other product and carefully dispense toppings onto it.

8. A dispensing device as claimed in claim 1, wherein the device comprises a handle.

9. A dispensing device as claimed in claim 8, the dispensing device comprising a lever for actuating the valve means, the lever being mounted to the handle.

10. A dispensing device for dispensing topping material onto cakes or other products, the device comprising a container having a sidewall which tapers inwardly towards an opening in the base thereof, the base being provided with valve means which can be operated to dispense material from the container, wherein the valve means comprises a pair of downwardly inclined flaps hinged to opposite sides of the opening in the base of the container.

11. A dispensing device as claimed in claim 10, wherein the container is graduated to indicate the volume of the material in the container.

12. A dispensing device as claimed in claim 10, wherein the container is frusto-conical.

13. A dispensing device as claimed in claim 10, comprising a lever for actuating the valve means.

14. A dispensing device as claimed in claim 10, the device being arranged for hand use, so that the user can hold the device over a cake or other product and carefully dispense toppings onto it.

15. A dispensing device as claimed in claim 10, wherein the device comprises a handle.

16. A dispensing device as claimed in claim 15, the dispensing device comprising a lever for actuating the valve means, the lever being mounted to the handle.

* * * * *

UNITED STATES PATENT AND TRADEMARK OFFICE
CERTIFICATE OF CORRECTION

PATENT NO. : 5,622,285
DATED : April 22, 1997
INVENTOR(S) : Ida Jessica Sau Ming Lee It is certified that error appears in the above-indentified patent and that said Letters Patent is hereby corrected as shown below:

Title page, item [54] and col. 1, line 1, the title should read--
"Tapered Culinary Dispensing Device"--.

Signed and Sealed this

Twenty-ninth Day of July, 1997

*Attest:*

BRUCE LEHMAN

*Attesting Officer*     *Commissioner of Patents and Trademarks*